Aug. 19, 1924.

N. J. OLSEN 1,505,163

EXPANSIBLE PULLEY

Filed Nov. 21, 1922

WITNESSES
Guy M. Spring
Chas. R. Smith

Inventor
NELS I. OLSON

By Richard B. Owen, Attorney

Patented Aug. 19, 1924.

1,505,163

UNITED STATES PATENT OFFICE.

NELS I. OLSON, OF NORTHWOOD, NORTH DAKOTA.

EXPANSIBLE PULLEY.

Application filed November 21, 1922. Serial No. 602,396.

*To all whom it may concern:*

Be it known that I, NELS I. OLSON, a citizen of the United States, residing at Northwood, in the county of Grand Forks and State of North Dakota, have invented certain new and useful Improvements in Expansible Pulleys, of which the following is a specification.

The present invention relates to improvements in driving and other pulleys and the principal object of the invention is to provide a device of this nature which may be expanded and contracted so as to alter the diameter thereof whereby any slackness of the driving or driven pulley which may occur during use may be taken up.

Another object of the invention is to provide a segmental rim capable of contraction and expansion by adjusting the sections in relation to each other, said sections being overlapped so that the perimeter or rim will present a comparatively rough surface so as to prevent slipping of the bell frame thereover.

With the above and numerous other objects in view as will appear as the description progresses, the invention resides in certain novel features of construction, and in the combination and arrangement of parts as will be hereinafter more fully described and claimed.

In the drawing—

Figure 1:
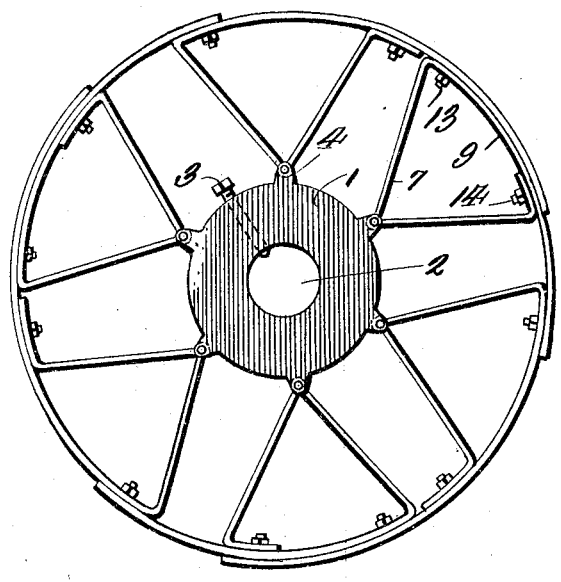
Figure 1 is a side elevation of the pulley embodying my invention.
Figure 2:
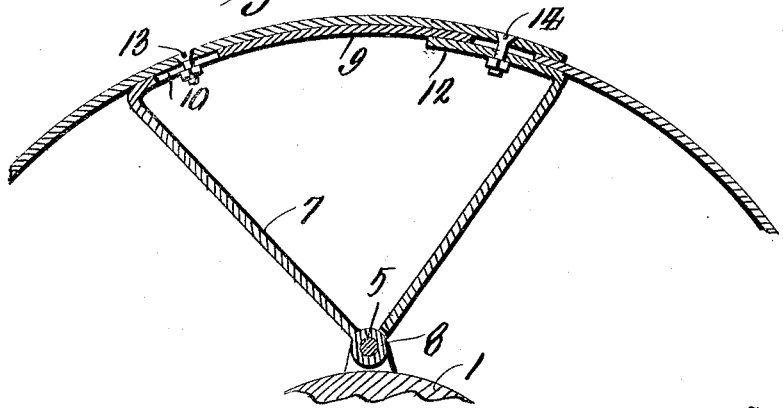
Figure 2 is an enlarged fragmentary section therethrough.

Referring to the drawing in detail it will be seen that a hub 1 is constructed with the usual opening 2 for receiving a shaft or the like and I preferably provide a set screw 3 so that the hub may be keyed to the shaft for rotation therewith. On the hub 1 I provide a series of apertured ears 4 arranged in registering pairs so that a pin 5 may be supported by each pair.

The rim of the pulley wheel is formed in a plurality of sections each consisting of a pair of spoke members 7 which converge toward the hub 1 and are connected by means of a sleeve 8 which receives the respective pin 5. The body 9 of each section is of arcuate formation and provided with slots 10 adjacent each spoke member 7. This body 9 is formed integral with one spoke member 7 and extends over the other spoke member being supported in relation thereto by a lip 12 formed integral with the other spoke member 7.

These sections are assembled as is shown to advantage in Figure 1 so that the body of each section overlaps the section to the right thereof considering Figure 1 in a clockwise direction. The bolts 13 have their heads countersunk and extend through the overlapped portions of the bodies 9 passing through the slots 10 in the bodies of adjacent sections and securely held in place by nuts. When these nuts are loosened on the bolts 13 the bodies 9 may be slid in relation to each other by varying the angle between the spoke members 7. The smaller the angles between the spoke members 7 the larger will be the diameter of the rim. The ends of the bodies 9 are fastened to the lips 12 of the adjacent sections by the bolts 14 which pass through one of the slots 10 provided in the bodies.

It is thought that the invention will now be understood without a more detailed description thereof but it is desired to point out that numerous changes in the details of construction and in the combination and arrangement of parts may be resorted to without departing from the spirit of the invention as hereinafter claimed.

Having thus described my invention what I claim as new is:—

1. An expansible pulley comprising a rim formed of a plurality of sections having bodies adapted to slide over one another, each section including a pair of connected spoke members converging toward the center of the pulley, said bodies attached to one spoke member and curved to extend over the other spoke member and means for holding the bodies in adjusted relation in respect to one another.

2. An expansible pulley comprising a hub, a plurality of rim sections mounted on the hub, each section including a pair of connected spoke members of yielding material converging toward the hub so that the angle there-between may be varied, and a body portion fixed to one spoke member and overlapping the end of the other spoke member, said spoke members being connected to said hub at their juncture with each other, and means for holding the bodies in adjusted positions in respect to one another.

3. An expansible pulley comprising a hub, a plurality of rim sections, each section including a sleeve, a pair of spoke members converging toward the sleeve and formed of yielding material so that the angles therebetween may be varied, and a body portion fixed to one spoke member and overlapping the end of the other spoke member, means for holding the bodies of the sections in adjusted positions in relation to each other, and means for pivotally mounting the sleeves on the hub.

4. An expansible pulley comprising a hub, a plurality of rim sections mounted on the hub, each section including a pair of integrally connected spoke members of yielding material converging toward the hub so that the angle therebetween may be varied, and a body portion fixed to one spoke member and overlapping the end of the other spoke member, said body portions being extended so as to overlap one of the next adjacent body portions and means for holding the body portions in adjusted positions in respect to one another.

In testimony whereof I affix my signature in presence of two witnesses.

NELS I. OLSON.

Witnesses:
J. L. GOESON,
BLANDA PETERSON.